(12) United States Patent
Sherwin

(10) Patent No.: US 6,520,317 B2
(45) Date of Patent: Feb. 18, 2003

(54) PACKAGING AND CASING SYSTEM

(75) Inventor: John P. Sherwin, Sussex, WI (US)

(73) Assignee: ABB Inc., New Berlin, WI (US)

(*) Notice: Subject to any disclaimer, the term of this patent is extended or adjusted under 35 U.S.C. 154(b) by 10 days.

(21) Appl. No.: 09/844,260

(22) Filed: Apr. 27, 2001

(65) Prior Publication Data

US 2002/0157919 A1 Oct. 31, 2002

(51) Int. Cl.$^7$ ................................................ B65G 47/26
(52) U.S. Cl. ..................... 198/438; 198/436; 198/468.4
(58) Field of Search ................................. 198/436, 438, 198/468.4, 427, 429

(56) References Cited

U.S. PATENT DOCUMENTS

| | | | |
|---|---|---|---|
| 2,941,341 A | 6/1960 | Clinton | |
| 3,225,891 A | 12/1965 | Hickin et al. | ................ 198/438 |
| 3,373,664 A * | 3/1968 | Brockmuller | ........... 198/436 X |
| 3,388,815 A * | 6/1968 | Lingl | ..................... 198/436 X |
| 3,869,843 A | 3/1975 | Darrah, III et al. | |
| 5,636,726 A * | 6/1997 | Nield | ................... 198/468.4 X |
| 5,927,053 A | 7/1999 | Donovan et al. | ............. 53/543 |
| 6,122,895 A | 9/2000 | Schubert | ........................ 53/55 |

FOREIGN PATENT DOCUMENTS

GB 425989 * 7/1937 ................. 198/438

OTHER PUBLICATIONS

Salwasser—Packaging Machinery, Designers & Manufacturers Brochure Date unknown.

* cited by examiner

Primary Examiner—James R. Bidwell
(74) Attorney, Agent, or Firm—Ryan Kromholz & Manion, S.C.

(57) ABSTRACT

A system and method for case-packing articles utilizing an infeed conveyor and spaced apart outfeed conveyors positioned at opposite sides of the infeed conveyor and a robotic operating arm arranged for transverse operation with respect to the longitudinal movement of each of the conveyors.

9 Claims, 4 Drawing Sheets

PACKAGING AND CASING SYSTEM

FIELD OF THE INVENTION

The present invention relates to packaging and casing systems and specifically to a packaging process whereby a plurality of articles may be removed from a supply, or infeed conveyor and alternatively placed into shipping boxes or cartons transported on outfeed conveyors located on opposite sides of the supply conveyor.

The process may be performed using a single, two-axis robot arm for pickup, transporting and release of an article or articles.

BACKGROUND OF THE INVENTION

Past efforts in the field of packaging and casing of processed articles involved tedious and time-consuming manual operations, usually required a large number of personnel possessing a high degree of dexterity. Early mechanical innovations were also beset with numerous problems, such as high initial cost of apparatus involved, inability of such apparatus to adapt itself for use with other existing equipment utilized in the production of such articles, inability of such apparatus to meet the demands for high production of articles, or objects, to be packaged and encased in shipping cartons, and the susceptibility of such apparatus to repeated breakdown and repair, and thus incurring a high maintenance cost.

A known current operating system of which the applicant herein is aware, provides a single conveyor line used for transporting containers, or empty cartons, to be filled and operating in an "open" position and a "load" position. A box or carton is formed and opened at the "open" position. Articles are placed in the carton at the "load" position. In that location, the single conveyor line must be stopped during loading and a package-transporting robot arm is also stopped when the carton has been filled, and is retained in the stopped position until a new empty carton is placed in front of the robot arm. In contrast, the present system is continuous in operation. The present loading system for transferring manufactured articles into shipping boxes eliminates the need to stop the conveyor or the robot arm movement.

SUMMARY OF THE INVENTION

The present invention, in a preferred embodiment, provides a packaging and casing system, wherein a plurality of articles are removed from a supply, or infeed conveyor and are alternatively placed into shipping boxes or cartons transported on outfeed conveyors located at opposite sides of the supply conveyor. This embodiment may also include the use of a single, two-axis robot arm operating in a path transverse to the longitudinal, parallel paths of an intermediately disposed supply, or infeed conveyor, and a pair of outfeed conveyors located at opposite sides of the infeed conveyor. The robot arm and its end effector are designed to reach across its closest outfeed conveyor, the infeed conveyor, and thereafter to the outermost outfeed conveyor.

Thus, it is a principal object of the present invention to provide a continuously operated packaging and casing system which will overcome the disadvantage of prior systems, wherein a single conveyor line must be stopped during loading and its cooperating robot arm must be stopped when a carton has been filled, and until a new empty carton has been placed in filling position directly in the operating path of the robot arm.

DETAILED DESCRIPTION

Figure 1:
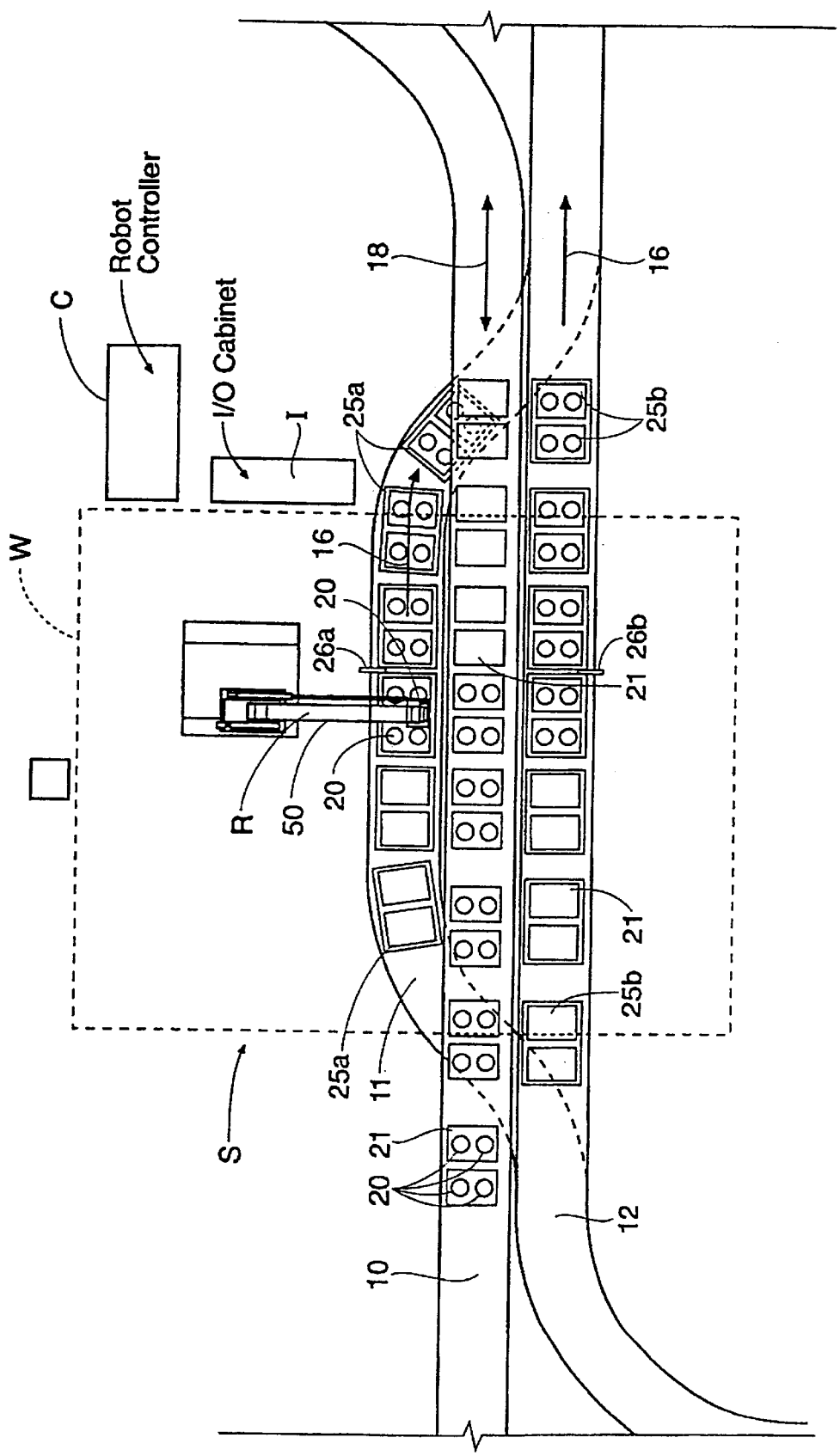
FIG. 1 is a top plan view of the various cooperating elements or components involved in the operation of the improved system encasing process of this invention.

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims herein.

Like elements illustrated and described herein are denoted by like reference characters.

The packaging and casing system of the present invention is illustrated in the various FIGS. 1–7, inclusive, and is generally indicated by the reference character S. With reference to the plan view of FIG. 1, the system S is preferably contained within the confines of a workstation W, and is preferably arranged to utilize a two-axis robot R. The controller C and the I/O cabinet I for the robot R are each conventional, and are usually positioned externally of the workstation W for convenience and safe operation of the system components. The robot R and its operating arm 50, along with its end effector 14, are arranged for transverse operational movement in a plane substantially normal to the respective longitudinal planes of the infeed conveyor 10 and outfeed conveyors 11 and 12. The outfeed conveyors 11,12 are respectively located at opposite sides of the infeed conveyor 10, and are preferably in general parallel arrangement therewith.

The outfeed conveyors 11 and 12 may move from left to right, as shown by the arrow 16, in the view of FIG. 1. The intermediate infeed conveyor 20 may move in either longitudinal direction, as shown by the arrow 18, relative to the pre-selected direction of the outfeed conveyors 11 and 12, depending upon the location of the source of an object or article 20 and transporting tray 21 carried thereby. The infeed conveyor 10 may carry unpacked product, such as produce, or prepackaged product, such as baked muffins, or the like. For purpose of illustration, the product, or article, identified by the reference numeral 20, will have been conventionally placed on trays 21 during and/or after processing.

The product 20 and respective trays 21 are transported on the conveyor 10 to a workstation area designated herein by the phantom lines identified by the letter W. There is no particular configuration assigned to the workstation W, other than an unloading/loading area for alternative disposal of an article or product 20 from the infeed conveyor 10 to either of outfeed conveyors 11 and 12.

Figure 2:
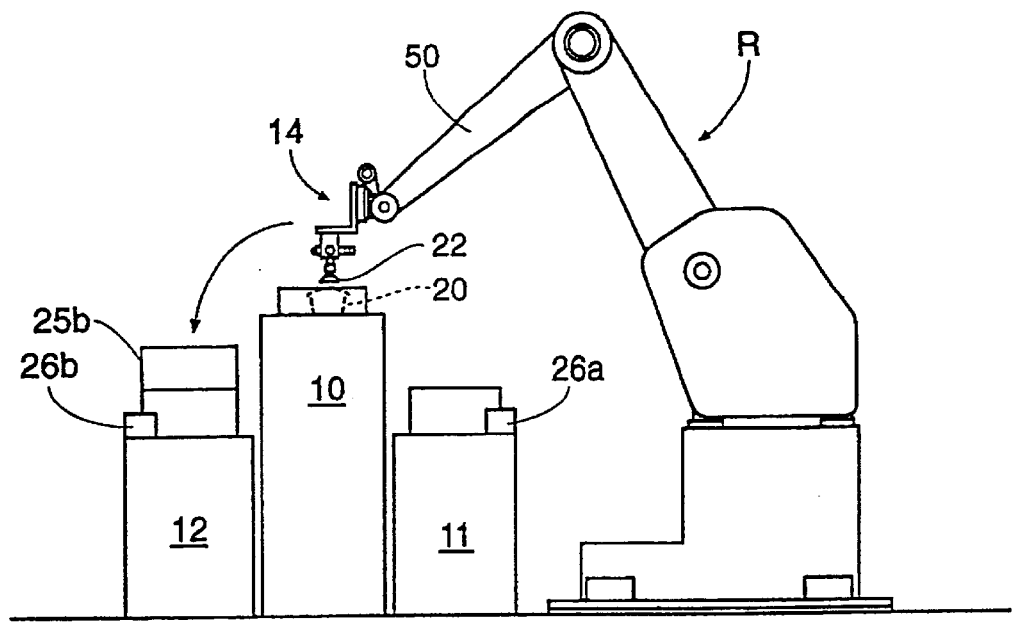
FIGS. 2–7, inclusive, are end views, with respect to FIG. 1, and are arranged in sequence of operation of the improved system depicted in FIG. 1.

It is usual to supply an end-effector 14 of the robot arm 50 with suction cups 22 or other grasping means (see FIG. 2). The product 20 is lifted by the suctions cup or cups 22, or other grasping means, from the infeed conveyor 10 and placed in the empty cartons 25a of the outfeed conveyor 11 and, alternatively, from the infeed conveyor 10 to an empty box or container 25b resting on the outfeed conveyor 12. Previously, where only one outfeed conveyor (not shown) was supplied, it was necessary to stop the action of the robot R after filling an empty box 25, and after that box was filled, it would have been released, and a new empty box 25 would have been placed in line with the arm 50 for filling. When either box 25a or 25b has been filled, the robot arm 50 immediately begins filling box 25a or 25b located on the opposite outfeed conveyor 11 or 12 without interruption, and there will be continuous operation which may be readily controlled to provide for heavy-duty items, as well as delicate items, such as bottled medicine, or the like.

The present system S exhibits increased speed of operation and ease in product handling, and completely eliminates the need for expensive manual labor. This will become apparent with reference to the views of FIGS. 2–7, inclusive, wherein FIG. 2 is considered as illustrative of a pickup position of the end effector 14, and its suction cup(s)22 being positioned to remove an article 20 (shown in phantom) from the infeed conveyor 10. The empty carton 25b will have been momentarily held in place during loading, against its stop 26b. Upward, movement of the stop 26b is controlled by the robot controller C, and is timed to work in sequence with movement of the conveyors 10,11 and 12, in order to minimize any prolonged stopping during transfer and loading operations.

Figure 3:
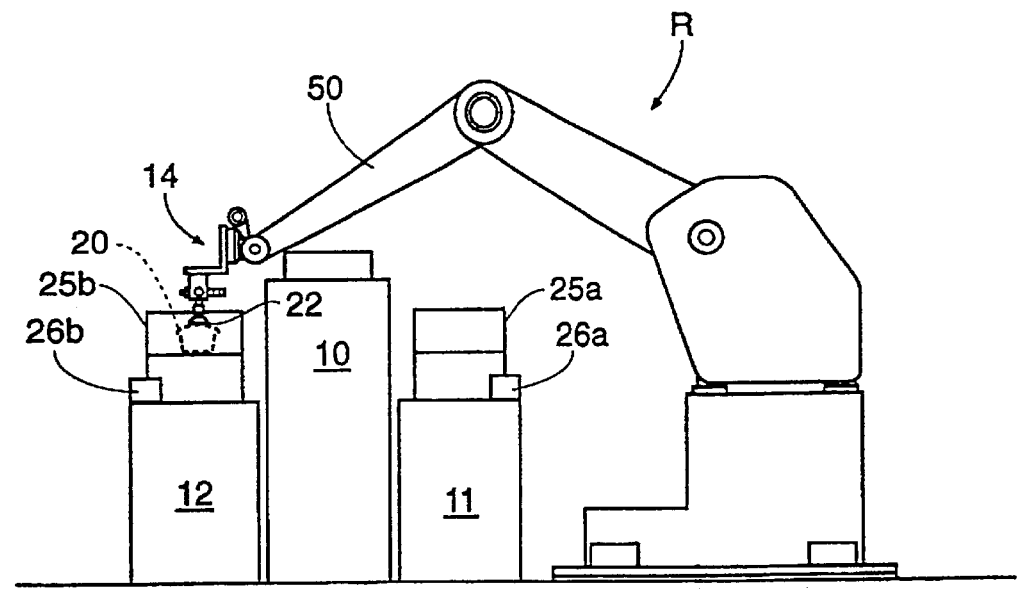

Next, with reference to FIG. 3, the robot R controller C causes the arm 50 to place the article to be transported into its empty carton 25b resting on outfeed conveyor 12, and against its stop 26b. Meanwhile, an empty container 25a has been moved by conveyor 11 to loading position, resting against raised stop 26a.

Figure 4:
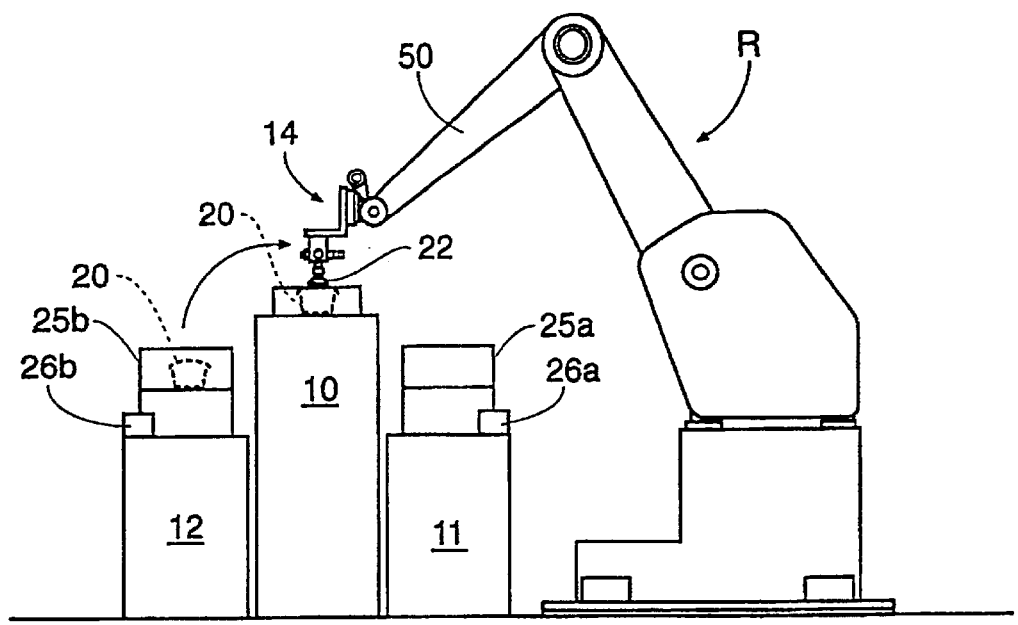
Figure 5:
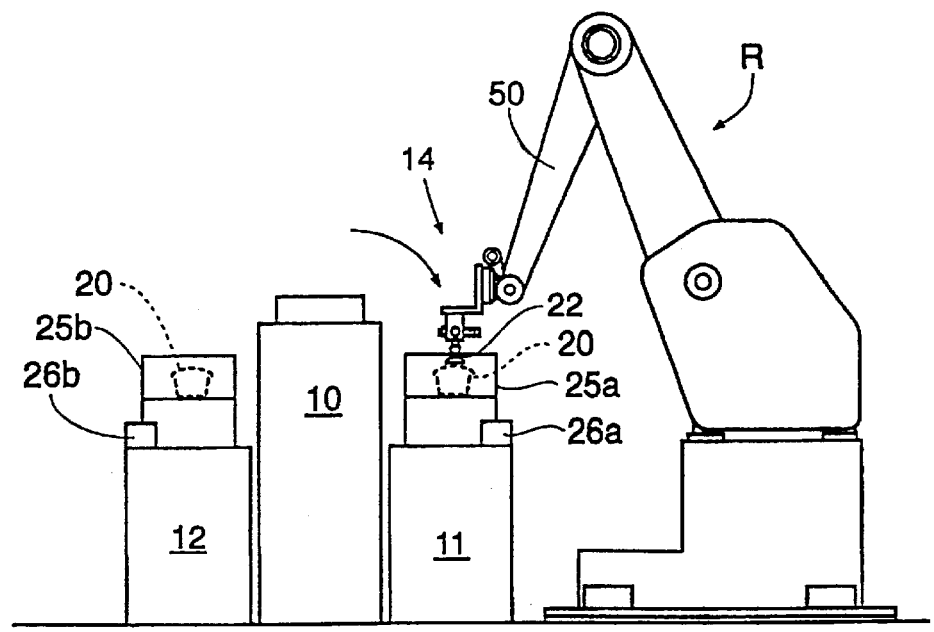

FIG. 4 is illustrative of the components of the system S disposed in relative operating position for movement of the arm 50 of the robot R to operating position of its end effector 14 and grasping element(s) 22, relative to infeed conveyor 10 and its contents 20 ready for removal of the articles 20 and transfer to an awaiting unfilled carton, or container 25a, supported by outfeed conveyor 11. The next sequential position of the cooperating components of the system S is illustrated in the view of FIG. 5, wherein it will be observed that the arm 50 of the robot R has been moved to the position with its end effector 14 being located directly above the outfeed conveyor 11 for encasement of the transported article 20 in the empty container 25a.

Figure 6:
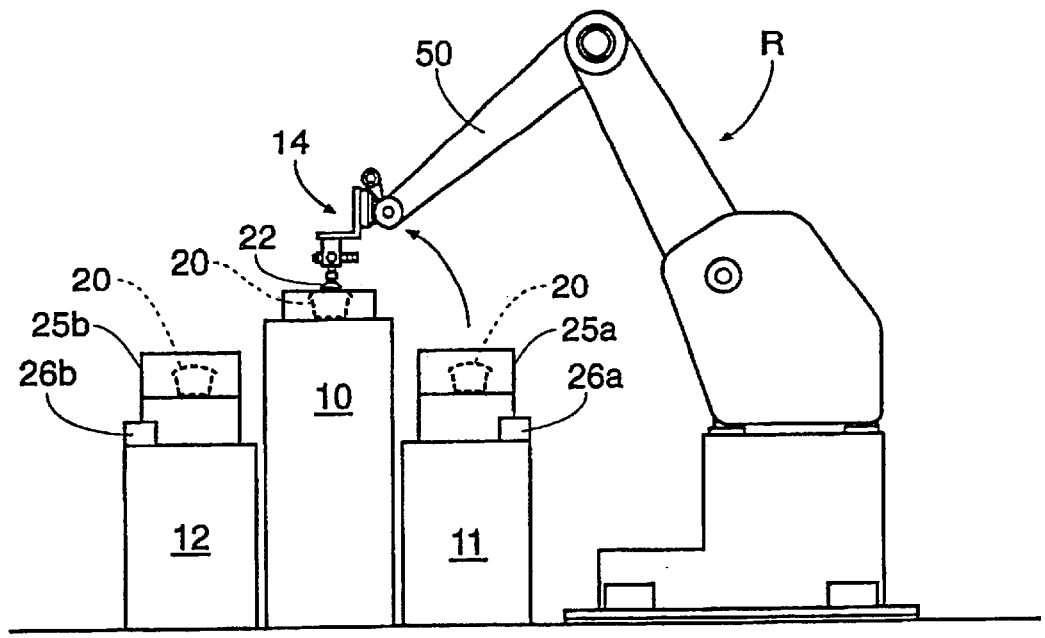
Figure 7:
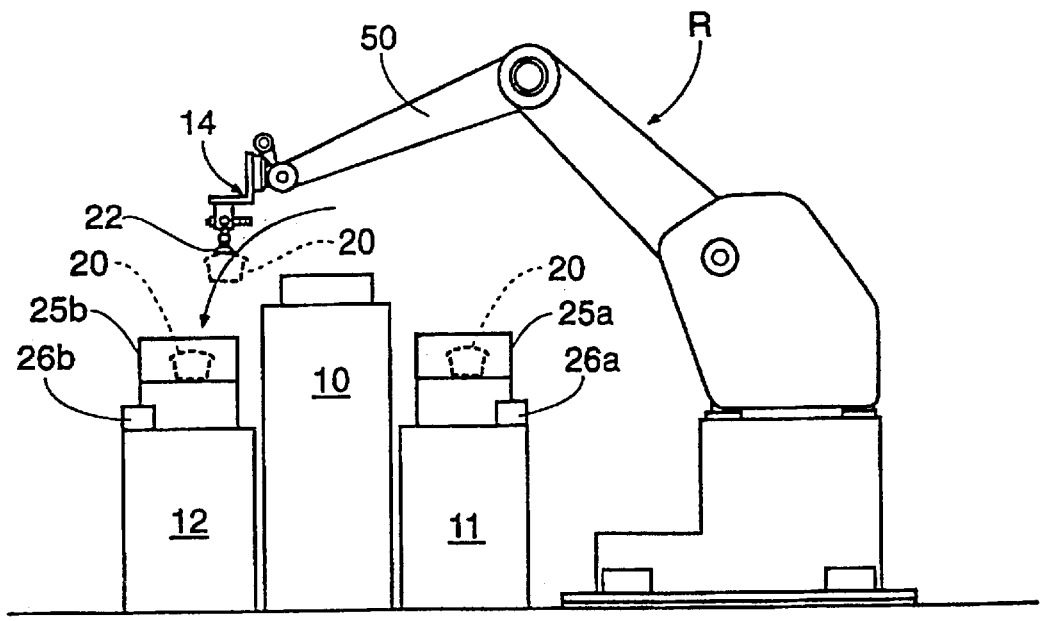

Next, with respect to the view of FIG. 6, the robot arm 50 is moved for pickup position of the product, or article, previously moved to that location by the infeed conveyor 10. FIG. 7 illustrates the movement of the robot arm 50 back to the original position shown in FIG. 1, ready for transfer to and loading of the container 25b, which has been momentarily restrained by its stop 26b.

It will be apparent that each of the various stages of operation of the components illustrated in the sequential views of FIGS. 2–7, inclusive, are completed with minimal interruption of the respective operating movements of the conveyors 10, 11, or 12 or of the robot arm 50. Furthermore, it should be appreciated that the sequence of operation of the robot arm 50 may be varied without departing from the present invention. For example, the robot arm 50 may grasp, transport and release articles 20 between infeed conveyor 10 and outfeed conveyor 12 multiple times before grasping articles and transferring them to outfeed conveyor 11. As a further example, the requisite number of articles 20 required to fill tray 21 may be conveyed from the infeed conveyor 10 to the outfeed conveyor 12 before articles a transferred to outfeed conveyor 11.

Alternatively, the invention may be described as a method for alternatively transferring objects from a source to a work station, said method comprising the steps of: providing an infeed conveyor and a pair of outfeed conveyors; providing a two-axis robot having a continuously operating arm arranged to pickup an object from said infeed conveyor and transfer said object to one of said outfeed conveyors; controlling said arm to effect pickup of said object at said infeed conveyor; moving said operating arm from said infeed conveyor to said one of said outfeed conveyors; controlling said arm to release and deposit said object on said outfeed conveyor; returning said operating arm to said infeed conveyor; controlling said arm to effect pickup of a second object at said infeed conveyor; moving said continuously operating arm from said infeed conveyor to said other of said outfeed conveyors; controlling said arm to release and deposit said second object on said other of said outfeed conveyors; and returning said operating arm to said infeed conveyor for subsequent pickup and transfer of additional objects to a selected one of said outfeed conveyors.

The above-described embodiments of this invention are merely descriptive of its principles and are not to be limited. The scope of this invention instead shall be determined from the scope of the following claims, including their equivalents.

What is claimed is:

1. A system for conveying and alternatively transferring an object from an infeed conveyor to a selected one of a pair of outfeed conveyors, said system including:

an infeed conveyor and a pair of outfeed conveyors;

a workstation positioned in operating alignment with said infeed conveyor and arranged to receive objects conveyed thereto;

each output conveyor of said pair of outfeed conveyors being located in operating alignment with said workstation and arranged to alternatively receive objects therefrom;

a two-axis robot including an operating arm arranged to remove said object from said infeed conveyor at said workstation and to transfer said object to a pre-selected one of said pair of said outfeed conveyors; and control means adapted to control operation of said robot to effect alternative transfer of said object from said infeed conveyor to said pre-selected outfeed conveyor.

2. The system according to claim 1, wherein each of said outfeed conveyors are disposed at opposite sides at said infeed conveyor and in substantial parallel operating relationship with said infeed conveyor.

3. The system according to claim 2, wherein said robot operating arm is positioned to operate in a transverse plane intersecting the parallel longitudinal operating planes of each of said conveyors.

4. The system according to claim 3, wherein said robot operating arm includes an end effector for effecting pick up of the object from said infeed conveyor at said workstation and transferring said object from said workstation to a pre-selected outfeed conveyor.

5. The system of claim 4, wherein the end effector is arranged to operatively support at least one suction cup for effecting pick up and releasable retention of said object.

6. The system according to claim 4, wherein said robot operating arm is adapted to operate continuously and to alternatively locate its end effector from a first operating position effecting pick up of an object to a second operating position for transferring said object to a first of said pre-selected outfeed conveyors, and thereafter to be moved to effect pickup of an object from said infeed conveyor and transferring said object to the second of said pre-selected outfeed conveyors.

7. The system according to claim 1, wherein said control means comprises a programmable logic controller.

8. A method for alternatively transferring objects from a source to a work station, said method comprising the steps of:
- providing an infeed conveyor and a pair of outfeed conveyors;
- providing a two-axis robot having a continuously operating arm arranged to pickup an object from said infeed conveyor and transfer said object to one of said outfeed conveyors;
- controlling said arm to effect pickup of said object at said infeed conveyor;
- moving said operating arm from said infeed conveyor to said one of said outfeed conveyors;
- controlling said arm to release and deposit said object on said outfeed conveyor;
- returning said operating arm to said infeed conveyor;
- controlling said arm to effect pickup of a second object at said infeed conveyor;
- moving said continuously operating arm from said infeed conveyor to said other of said outfeed conveyors;
- controlling said arm to release and deposit said second object on said other of said outfeed conveyors; and
- returning said operating arm to said infeed conveyor for subsequent pickup and transfer of additional objects to a selected one of said outfeed conveyors.

9. The system according to claim 4, wherein an open-top box is disposed on at least one outfeed conveyor and said robot operating arm is adapted to operate continuously and to alternatively locate its end effector from a first operating position effecting pickup of an object to a second operating position for transferring said object to the open-top box on the first of said pre-selected outfeed conveyors, said robot operating arm continuing to alternatively locate its end effector from said first operating position for pick up of an object to said second operating position for transfer of said object to the open-top box until the entire box is filled.

* * * * *